(12) United States Patent
Akanda et al.

(10) Patent No.: US 9,396,071 B1
(45) Date of Patent: Jul. 19, 2016

(54) SYSTEM AND METHOD FOR PRESENTING VIRTUAL MACHINE (VM) BACKUP INFORMATION FROM MULTIPLE BACKUP SERVERS

(71) Applicant: EMC Corporation, Hopkinton, MA (US)

(72) Inventors: Mohammed A. Akanda, Redmond, WA (US); Scott C. Teerink, Mukilteo, WA (US); Michael D. Hartway, Sammamish, WA (US); Jerzy Gruszka, Bellevue, WA (US)

(73) Assignee: EMC Corporation, Hopkinton, MA (US)

( * ) Notice: Subject to any disclaimer, the term of this patent is extended or adjusted under 35 U.S.C. 154(b) by 111 days.

(21) Appl. No.: 14/302,059

(22) Filed: Jun. 11, 2014

(51) Int. Cl.
  *G06F 11/00* (2006.01)
  *G06F 11/14* (2006.01)
  *G06F 9/455* (2006.01)

(52) U.S. Cl.
  CPC ........ *G06F 11/1412* (2013.01); *G06F 9/45533* (2013.01)

(58) Field of Classification Search
  CPC ............ G06F 11/1448; G06F 11/1451; G06F 11/1453; G06F 11/1458; G06F 11/1461; G06F 11/1469; G06F 11/2069
  See application file for complete search history.

(56) References Cited

U.S. PATENT DOCUMENTS

| | | | | |
|---|---|---|---|---|
| 2012/0278287 A1* | 11/2012 | Wilk | ................... | G06F 11/1464 707/654 |
| 2014/0095816 A1* | 4/2014 | Hsu | ....................... | G06F 3/0655 711/162 |
| 2014/0201156 A1* | 7/2014 | Rosikiewicz | ..... | G06F 17/30067 707/651 |
| 2015/0074362 A1* | 3/2015 | Mohl | .................... | G06F 3/0667 711/162 |
| 2015/0127982 A1* | 5/2015 | Tung | ................... | G06F 11/1451 714/19 |

* cited by examiner

*Primary Examiner* — Nadeem Iqbal
(74) *Attorney, Agent, or Firm* — Blakely, Sokoloff, Taylor & Zafman LLP

(57) ABSTRACT

Techniques for managing virtual machine backup are described herein. According to one embodiment, a virtual machine (VM) management console queries VM backup data stored in backup servers. The VM management console manages VMs running within data processing systems over a network. In response to the request, the VM management console retrieves backup operational data from backup servers, the backup operational data describing the VM backup data backed up from the data processing system. A VM backup report is generated having the backup operational data therein and VM information of VMs that are associated with the VM backup data described by the backup operational data. The VM backup report is presented in the VM management console to allow a user to select one or more of the VMs to be recovered from the backup servers.

21 Claims, 9 Drawing Sheets

SYSTEM AND METHOD FOR PRESENTING VIRTUAL MACHINE (VM) BACKUP INFORMATION FROM MULTIPLE BACKUP SERVERS

FIELD OF THE INVENTION

Embodiments of the present invention relate generally to data storage systems. More particularly, embodiments of the invention relate to presenting virtual machine (VM) backup data from multiple backup servers.

BACKGROUND

Enterprise corporations must back up and recover large amounts of complex data. Many companies assign backup management and application management to separate employee roles/departments. Existing backup and recovery software requires a recovery operator, an application manager, to be familiar with backup technologies. Application managers are often not familiar with backup technologies and only need to perform recoveries of application data. Typically an application manager utilizes application management software to manage software applications distributed in multiple nodes over a network. For example, in a virtualization environment, an application typically uses a centralized virtual machine (VM) management software to manage VMs that are running in various client nodes. One example of such VM management software is a system center virtual machine manager (SCVMM) from Microsoft® Corporation. SCVMM is designed for management of large numbers of virtual servers.

However, from VM management server, a user or administrator can only access VM information of VMs running within the VM machines managed by the VM management server. A user cannot directly access a backup server that is configured to back up VM data from a VM machine. In order to access backup data stored in a backup storage server, a user has to launch separate backup management software specifically designed for accessing the backup server, but the backup management software typically cannot access VM information of VMs.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
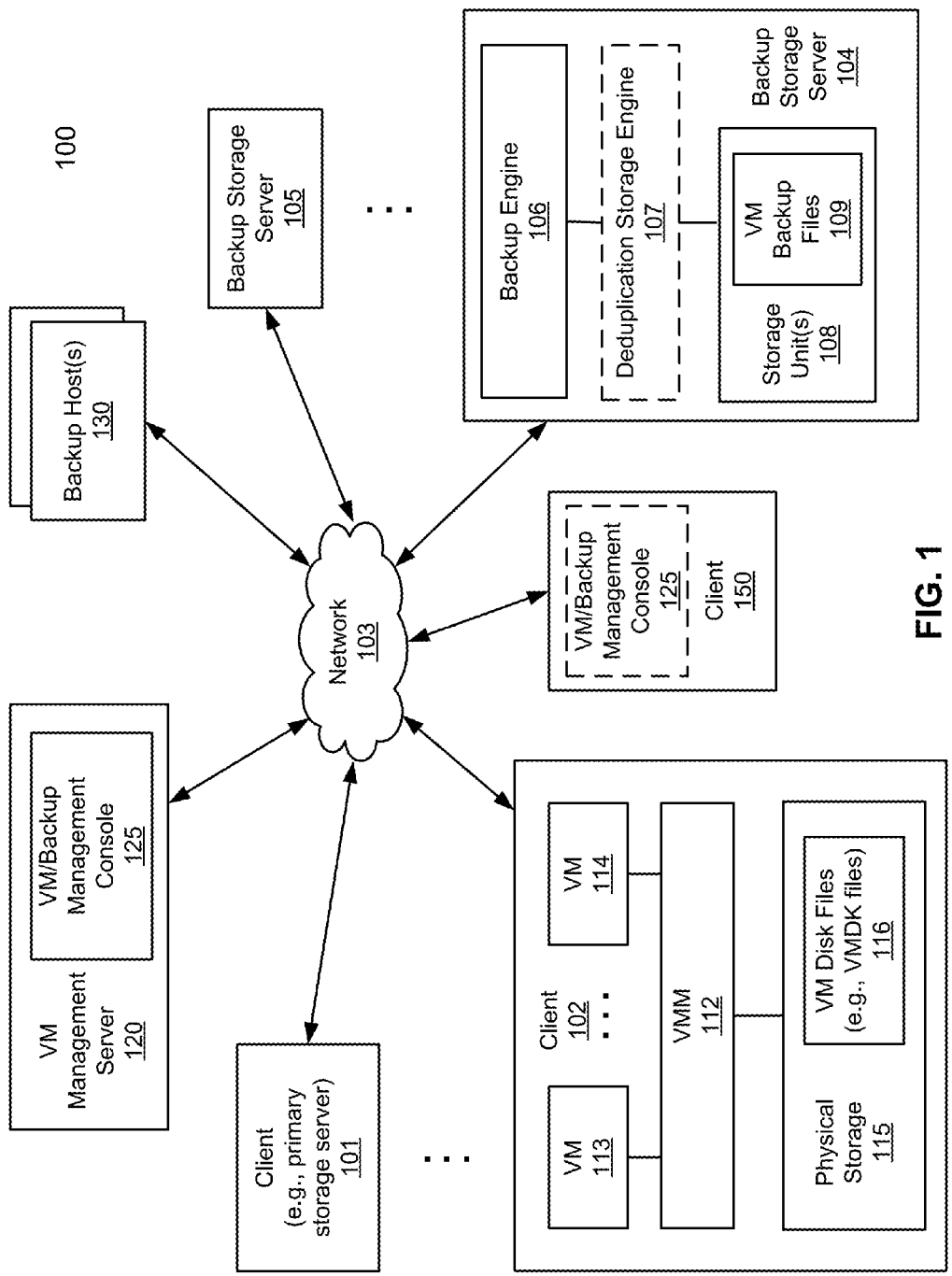
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a backup and recover (backup/recover) interface module (also referred to here as a backup/recover add-in or plugin) is integrated with VM management software running within a VM management server. With the integrated VM management server, a user can access both VM data of VMs running within one or more VM nodes and the associated VM backup data stored in one or more backup storage servers. The VM backup data can be presented to the user via an integrated VM backup report from which the user can initiate a recovery of one or more VMs from the backup storage servers to one or more destination machines.

In one embodiment, the VM management server employs various backup/recover interface modules, each corresponding to one of different types or classes of VM backup data stored in the backup storage servers. A backup/recover interface module hosted within the VM management server is to communicate with a backup storage server of a particular type or class to retrieve backup operational data from the backup storage server, and to convert the retrieved data to a common format recognized by the VM management software running within the VM management server. The VM management server is operating as a central point to interact with various backup storage servers using proper backup/recover interface modules, which in turn communicate with the backup storage servers using proper communications protocols and/or data formats.

Once the backup operational data and other VM operational data are collected from the backup storage servers and the VM nodes, the collected operational data may be integrated or manipulated and a context-based VM backup report is generated. Dependent upon the specific request from a user on VM/Backup Management Console 125, the VM backup report lists at least some of the VMs and their respective backup operational data concerning the associated VM backup data. In one embodiment, the backup operational data includes any management information or metadata concerning the VM backup data including, but is not limited to, a source system from which the VM backup is backed up, time of the backup, a host that initiates the backup, a backup server storing the backup data, a destination for recovery, etc. From the context-based report, the user can select one or more of the VMs and initiate one or more recovery processes to recover the corresponding VM backup data from one or more backup servers to one or more designated machines.

FIG. 1 is a block diagram illustrating a storage system according to one embodiment of the invention. Referring to FIG. 1, system 100 includes, but is not limited to, one or more client systems 101-102 communicatively coupled to storage systems 104-105 (e.g., backup storage systems) over network 103. Clients 101-102 may be any type of clients such as a server, a personal computer (e.g., desktops, laptops, and tablets), or a mobile device (e.g., Smartphone), etc. Alternatively, any of clients 101-102 may be a primary storage system that provides storage to other local clients, which may periodically back up the content stored therein to a backup storage system, such as storage system 104. Network 103 may be any type of networks such as a local area network (LAN), a wide area network (WAN) such as the Internet, a fiber network, a storage network, or a combination thereof, wired or wireless.

Note that clients 101-102 may have the same or similar architectures. Similarly, storage systems 104-105 may also have the same or similar architectures. For the purpose of illustration, storage system 104 will be described in details, but the description is equally applicable to other storage servers such as server 105. Storage system 104 may include any type of server or cluster of servers. For example, storage system 104 may be a storage server used for any of various different purposes, such as to provide multiple users with access to shared data and/or to back up data (e.g., mission critical data). In one embodiment, storage system 104 includes, but is not limited to, backup engine 106, optional deduplication storage engine 107, and one or more storage units 108 communicatively coupled to each other. Storage units 108 may be implemented locally (e.g., single node operating environment) or remotely (e.g., multi-node operating environment). Storage units 108 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

In response to a data file to be stored in storage units 108, deduplication storage engine 107 is configured to segment the data file into multiple chunks (also referred to as segments) according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108 or across at least some of storage units 108. The metadata may be stored in at least some of storage units 108, such that files can be accessed independent of another storage unit. Metadata of each storage unit includes enough information to provide access to the files it contains.

In one embodiment, any of clients 101-102 may further include an optional deduplication engine having at least a portion of functionalities of deduplication engine 107. The local deduplication engines are configured to perform local deduplication operations, respectively. For example, prior to transmit data to storage system 104, each of the local deduplication engines may deduplicate the data into deduplicated segments and determine whether a particular deduplicated segment has been stored in storage system 104. A deduplicated segment is transmitted to storage system 104 only it has not been stored in storage system 104.

For example, when client 101 is about to transmit a data stream (e.g., a file or a directory of one or more files) to storage system 104, its deduplication engine is configured to deduplicate the data stream into deduplicated segments. For each of the deduplicated segments, client 101 transmits a fingerprint of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic and the processing resources required can be greatly reduced.

In one embodiment, backup engine 106 is configured to backup data from client systems 101-102 and to store the backed up data in one or more of storage units 108, which may be deduplicated by deduplication storage engine 107. In one embodiment, backup engine 106 can back up VM data from a client system that is stored in a virtual operating environment such as a VM provided by a variety of VM vendors such as VMware or Microsoft®. Further, instead of backing up the entire VM disk, a portion or subdirectory of the VM disk can be backed up. In this example, client 102 includes one or more VMs 113-114 hosted by VM monitor or manager (VMM) 112. Data of each of VMs 113-114 is stored in one of VM disk files 116 in physical storage 115 representing a virtual storage device of the associated VM. Data stored in VM disk files may be optionally deduplicated by deduplication storage engine 107. Similarly, VM backup data 109 can be subsequently recovered to any of clients 101-102.

A virtual machine represents a completely isolated operating environment with a dedicated set of resources associated with. A virtual machine may be installed or launched as a guest operating system (OS) hosted by a host OS. Typically, a host OS represents a virtual machine monitor (VMM) (also referred to as a hypervisor) for managing the hosted virtual machines. A virtual machine can be any type of virtual machines, such as, for example, hardware emulation, full virtualization, para-virtualization, and operating system-level virtualization virtual machines. Different virtual machines hosted by a server may have the same or different privilege levels for accessing different resources.

In one embodiment, the backup operations for backing up data from clients 101-102 to backup servers 104-105 may be managed or initiated by one or more backup hosts 130 (also referred to as backup management servers). VMs 113-114 of client 102, as well as other VMs of other clients (e.g., client 101) may be managed by VM management server 120. VM management server 120 can be any of the VM management server, such as, for example, SCVMM™ from Microsoft. Information stored and managed by VM management server 120 can be accessed via VM management console 125, which can be any client device. For example, VM management server 120 may be a cloud server and a user can use a browser application running within VM management console 125 to access the information presented by VM management server 120.

In one embodiment, in addition to accessing and managing VMs of clients 101-102, VM management server 120 includes VM/backup management console 125, which may be management software running within VM management server 120 and communicates with backup storage servers 104-105 to access the VM backup data stored therein (e.g., VM backup files 109). VM/backup management console 125 can then generate a context-based VM backup report or table representing certain VM information and associated backup information to allow a user or administrator to initiate a recovery of a particular VM backup. Note that backup storage servers 104-105 may be provided by the same or different storage providers. Storage servers 104-105 may or may not be compatible with each other in terms of communications protocols and/or data formats. VM/backup management console 125 of VM management server 120 is capable of communicating with different types of backup storage servers 104-105 to retrieve different backup operational data and incorporate with its VM management information to produce the context-based report. As a result, a user can access both the VM information of primary storage systems (e.g., clients 101-102) and the VM backup information from the backup storage servers (e.g., backup storage servers 104-105) from VM/backup management console 125 of VM management server 120 as an integrated VM and backup management system.

According to one embodiment, VM/backup management console 125 may be VM/backup management software deployed at client or server 150, where VM/backup management console 125 is configured to communicate with VM management server 120 and backup servers 104 over network 103, and to integrate and present the VM and backup data to its client(s).

Figure 2A:
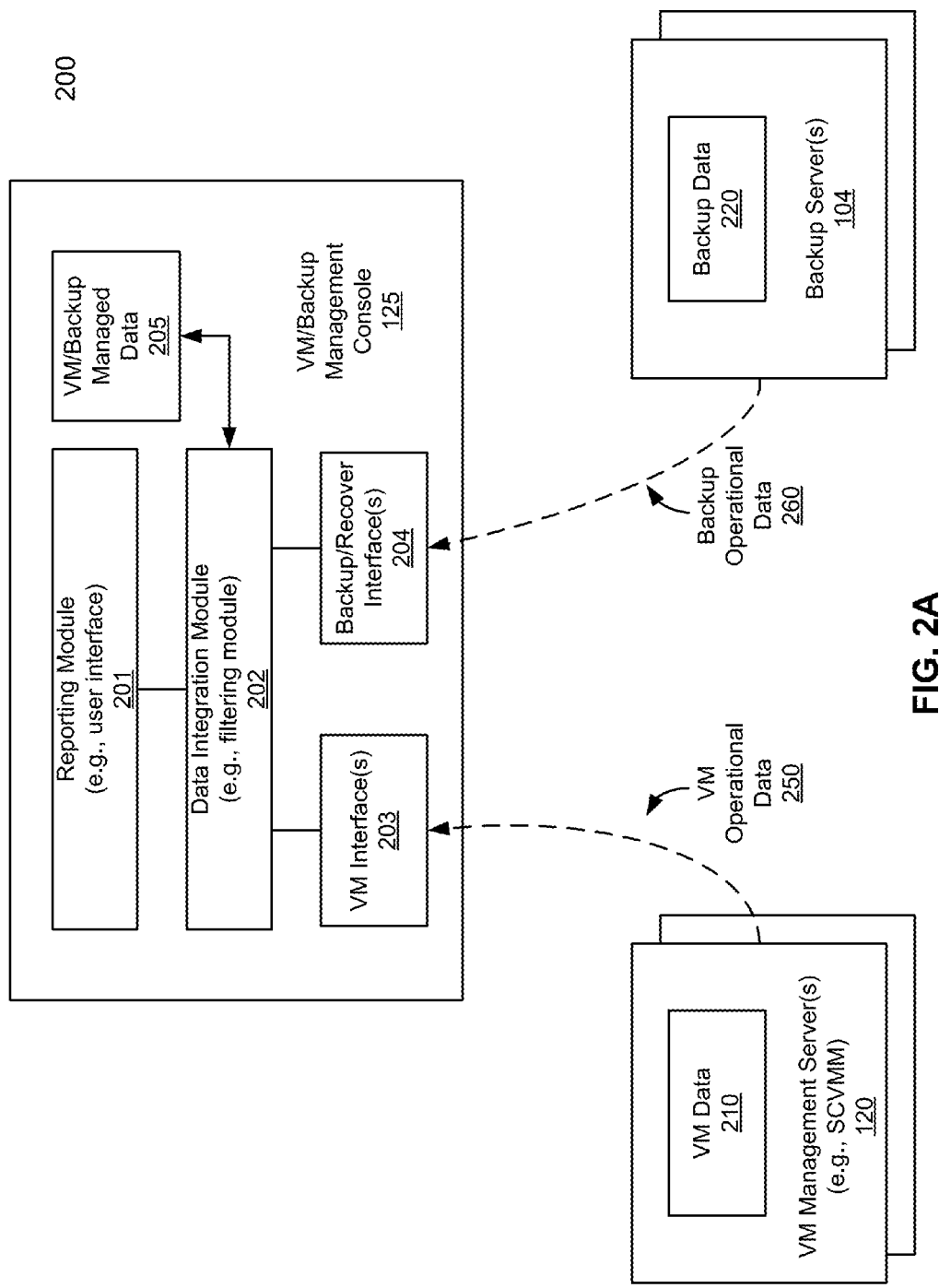
FIGS. 2A and 2B are block diagrams illustrating an integrated VM and backup management system according to certain embodiments of the invention.

FIG. 2A is a block diagram illustrating an integrated VM and backup management system according to one embodiment of the invention. System 200 may be implemented as part of system 100 of FIG. 1. Referring to FIG. 2A, VM/backup management console 125 is communicatively coupled to or integrated within VM management server 120 for accessing information provided by VM management server 120. VM/backup management console 125 may be a client application that is responsible for communicating with VM management server 120. Alternatively, VM management server 120 may be implemented as a cloud server or cluster of servers hosting VM/backup management console 125, where a client application may be just a browser application.

In one embodiment, VM/backup management console 125 includes reporting module 201 and data integration module or integrator 202. Reporting module 201 may be implemented as part of a user interface for accessing resources of VM/backup management console 125. Data integration module 202 is to receive backup operational data from various backup servers 104 and import and integrate (e.g., manipulating, filtering) backup operational data 260 with VM operational data 250 collected and maintained by VM management server(s) 120. VM operational data 250 may be periodically collected from some or all of the VM nodes 102 and cached within VM management server 120 (e.g., VM metadata database). The integrated data, which may be cached within VM/backup management console 125 as part of VM/backup managed database 205, is then utilized by reporting module to generate a VM backup report. The VM backup report is then presented in the GUI of the VM/backup management console 125.

In addition, VM/backup management console 125 employs various backup/recover interface modules 204, each corresponding to one of different types or classes of VM backup data stored in various backup storage servers 104. Backup/recover interface module 204 hosted within VM/backup management console 125 is to communicate with a backup storage server of a particular type or class to retrieve backup operational data from the backup storage server, in this example, backup server 104, and to convert the retrieved data to a common format recognized by the VM management software running within the VM management server, such as data integration module 202. Similarly, VM/backup management console 125 may optionally employ VM interface modules 203 to handle different kinds of VM systems deployed at clients 102. VM interface modules 203 may be designed to communicate with different types of VM systems (e.g., different types of VMMs) to retrieve VM operational data from clients 102. In this configuration, VM/backup management console 125 is operating as a central point to interact with various backup servers 104 using proper backup/recover interface modules 204 and various VM systems 102 via proper VM interface modules 203, respectively.

Once backup operational data 260 and VM operational data 250 are collected from the backup servers 104 and the VM management server 120, data integration module 202 is configured to analyze and process (e.g., filtering) the data. The filtered data is then used by report module 201 to generate a context-based report. Dependent upon the specific request from the user of the GUI on the VM/backup management console 125, the context-based report may include at least some of the VMs and their respective operational data concerning the associated VM backup data. The backup operational data 260 includes any management information, operating status, and/or metadata concerning the VM backup data including, but is not limited to, a source system from which the VM backup is backed up, time of the backup, a host that initiates the backup, a backup server storing the backup data, a destination for recovery, etc. From the context-based report, the user can select one or more of the VM backup data and initiate one or more recovery processes to recover the VM backup data to one or more designated machines. Similarly, VM operational data 250 may include any management information, operating status, and/or metadata concerning all VMs running within VM nodes 102. For example, VM operational data 250 includes VM information of individual VMs, VM cluster information concerning clusters of VMs, host information hosting the VMs, etc.

In one embodiment, a user of VM/backup management console 125 can retrieve certain backup operational data by specifying a particular parameter. In response, VM management console 125 communicates with VM management server 120 and backup servers 104 to retrieve the requested data associated with that particular parameter. For example, a user can specify a particular data processing system, such as, client system 102, to retrieve only the backup operational data associated with VM backup data that has been backed up from that particular data processing system. In response to such a request, VM/backup management console 125 is to identify a proper backup server that stores the requested VM backup data and communicate with the identified backup server to retrieve the requested data. Alternatively, VM/backup management console 125 can send a query having an identifier identifying that particular data processing system to some or all of the backup servers 104 to determine which of the backup servers 104 stores the requested VM backup data, and then retrieve the operational data from the determined backup server(s).

Similarly, in response to a request from a user, VM/backup management console 125 can retrieve backup operational data for VM backup data that is initiated by a particular backup host, for example, based on a backup host identifier specified in the request. VM/backup management console 125 can query, for example, by sending the backup host identifier to, the backup servers 104 to identify and retrieve the backup operational data. VM/backup management console 125 can retrieve backup operational data for VM backup data that is stored in a particular backup server. VM/backup management console 125 can retrieve backup operational data for VM backup data that was backed up during a particular period of time, where the period of time may be specified by the user of the GUI. VM/backup management console 125 can retrieve backup operational data for VM backup data of a particular VM backup image or instance, which may also be specified in the request. VM/backup management console 125 maintains mapping information having relationship information of various VM and backup information.

Figure 2B:
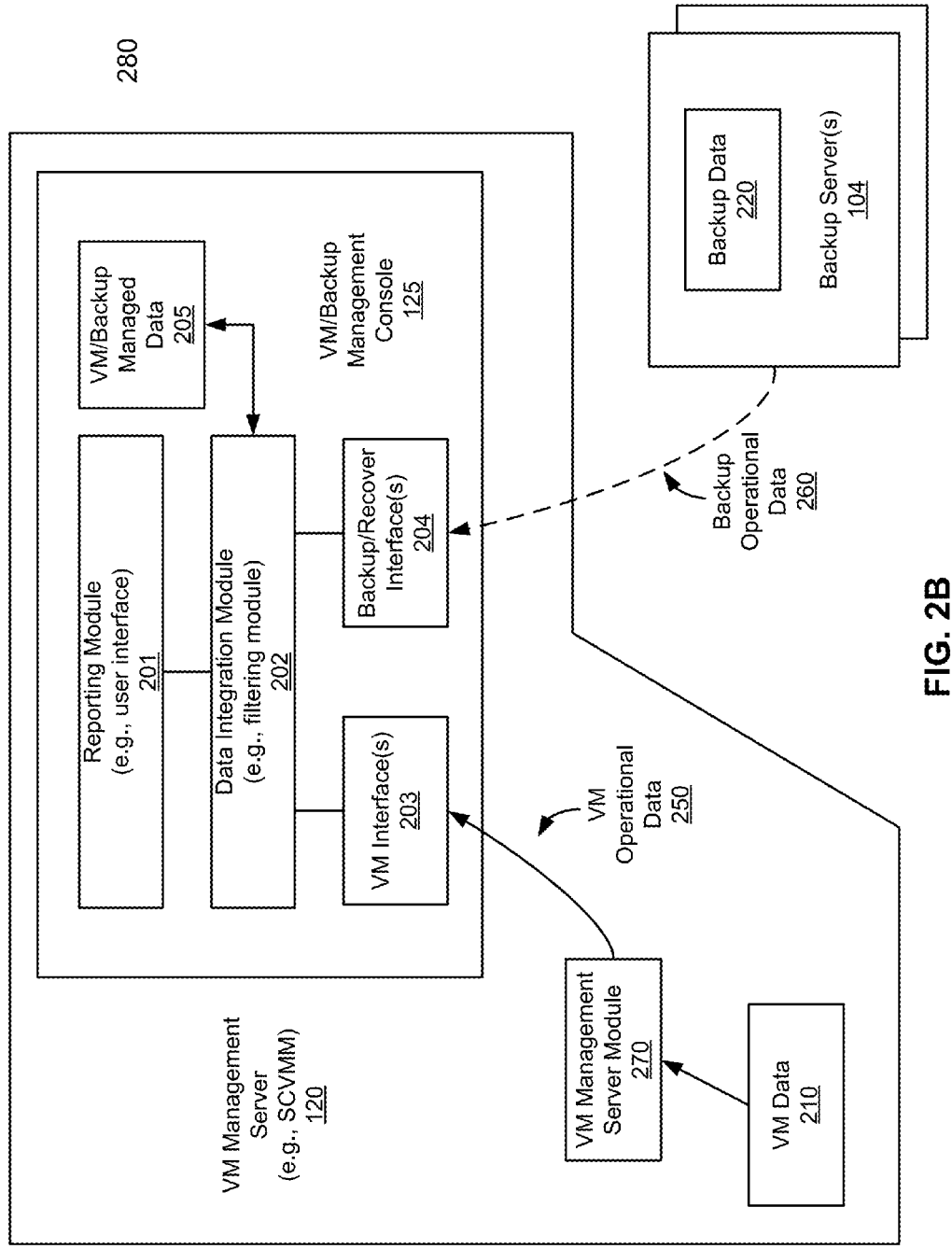

As described above, VM/backup management console 125 may also be integrated within VM management server 120 as a system component, as shown as system 280 in FIG. 2B. Referring to FIG. 2B, in this embodiment, VM/backup management console 125 is integrated within VM management server 120. VM/backup management console 125 is configured to access VM data 210 via VM management server module or component 270 and to access backup data 220 of backup servers 104 over a network. Other configurations may also exist.

Figure 3:
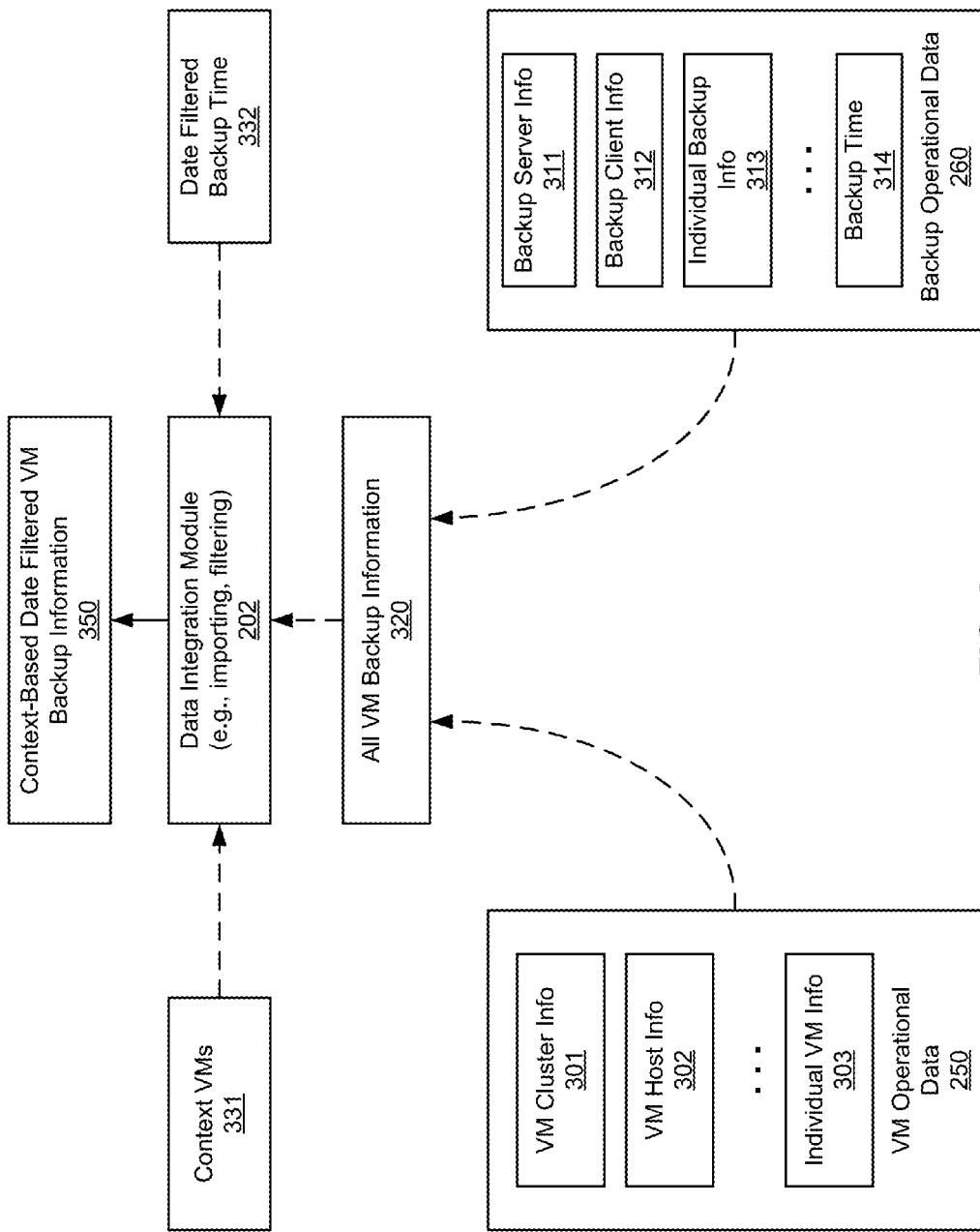
FIG. 3 is a block diagram illustrating an integrated VM and backup management system according to another embodiment of the invention.

Thus, as shown in FIG. 3, data integration module 202 of VM/backup management console 125 is to pull both the VM operational data 250 from VM management server 120 and backup operational data 260 from backup servers 104, and integrate the data based on user specified criteria within the VM/backup management console 125. An integrated report having both VM information and backup information is then generated by report module 201 and represented in the VM/backup management console 125. Referring to FIG. 3, in this example, VM operational data 250 includes, but is not limited to, information describing VM cluster configuration information 301, VM host configuration information 302, and individual VM configuration information 303, etc. Backup operational data 260 includes, but is not limited to, backup server information 311, backup client information 312, individual backup information 313, and backup time information 314, etc.

Again, VM operational data 250 and backup operational data 260 may be periodically generated or collected, and they may be cached in VM/backup management console 125, VM management server 120, VM nodes 102, and/or backup servers 104. For example, VM operational data 250 and backup operational data 260 may be obtained by querying a VM database and backup database maintained by VM management server 120, respectively. VM operational data 250 and backup operational data 260 form a complete set of VM and backup information 320. Based on a user request from VM/backup management console 125, data integration module 202 is to analyze VM/backup information 320 to generate report 350 specifically tailored to the VM/backup management console 125. In this example, VM/backup management console 125 may specify VM context information 331 and specific backup time 332. Based on information 331-332 provided by VM/backup management console 125, data integration module 202 filters data 320 to generate report 350, which is exposed to VM/backup management console 125 for presentation.

Figure 4A:
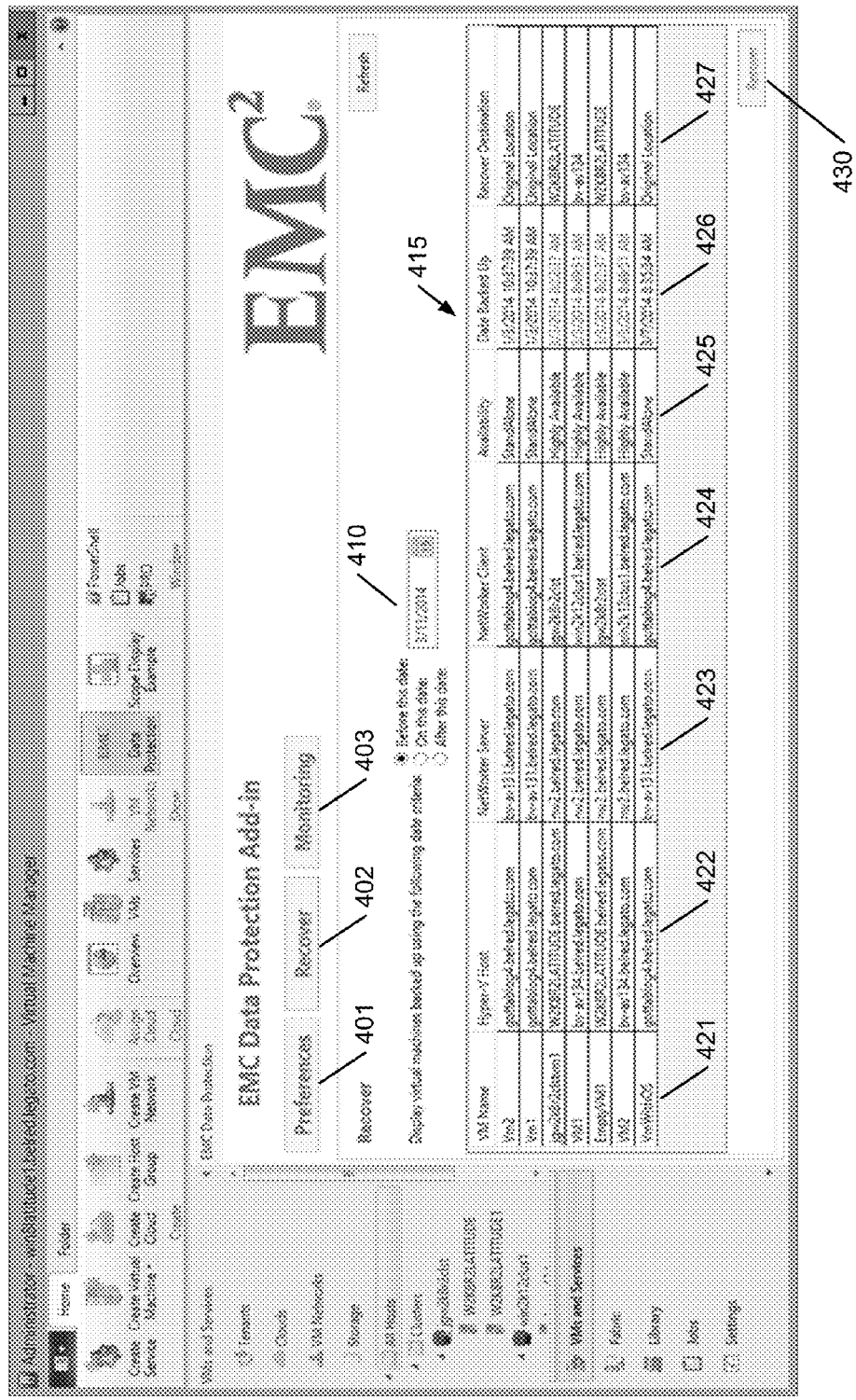
FIGS. 4A-4C are screenshots illustrating a graphical user interface provided by a VM management server according to one embodiment of the invention.
Figure 4B:
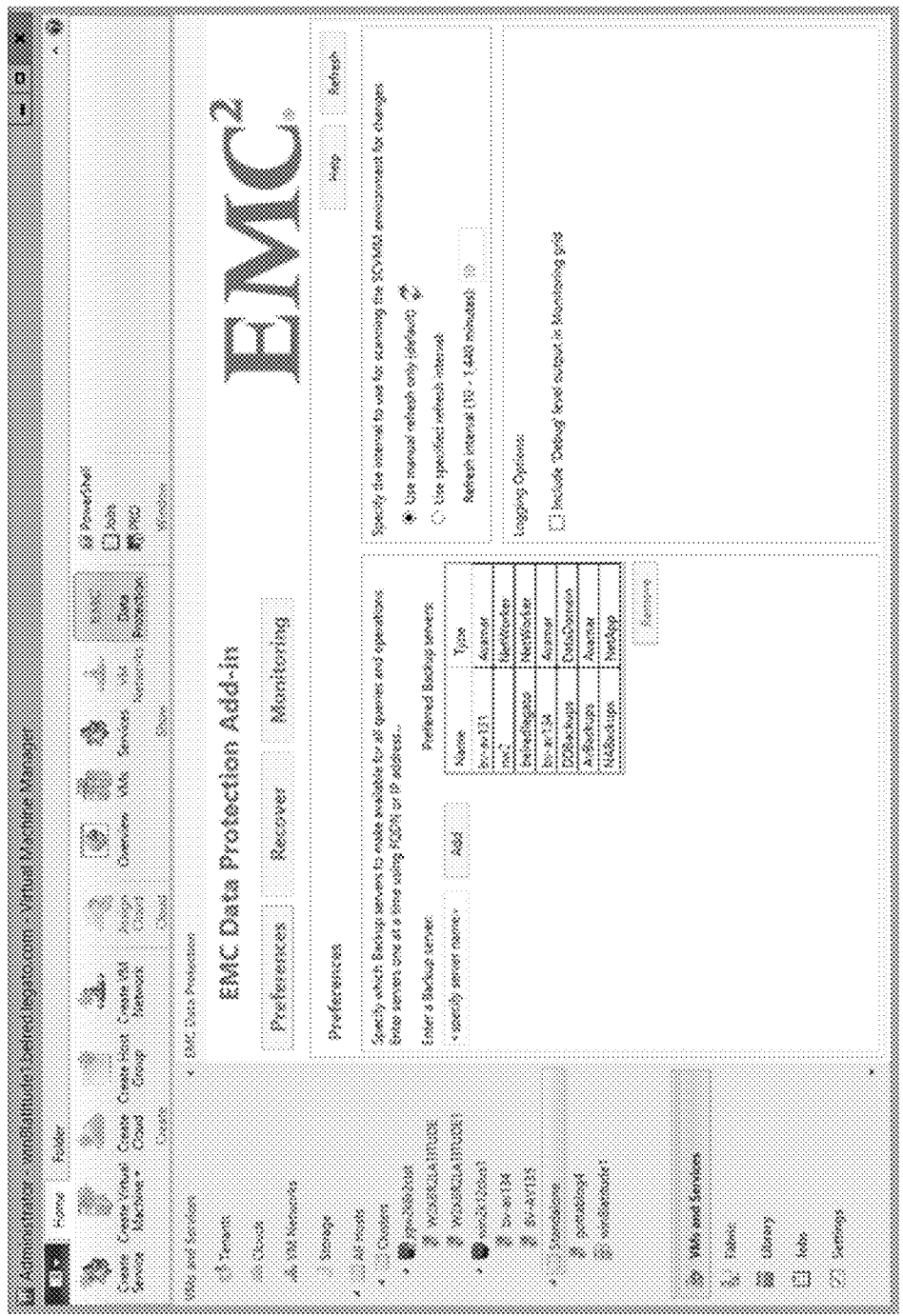
Figure 4C:
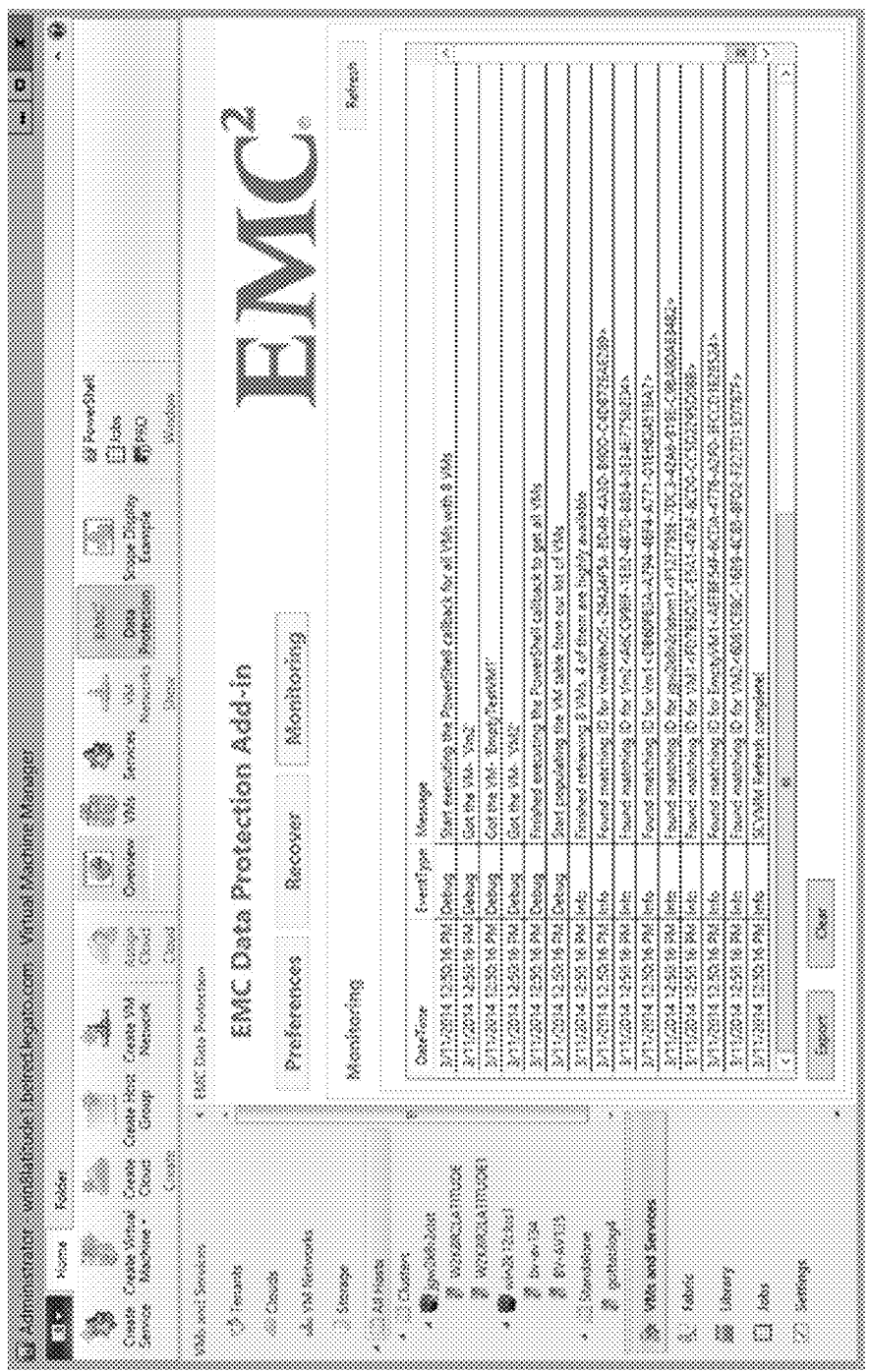

FIGS. 4A-4C are screenshots illustrating a graphical user interface provided by a VM/backup management console according to one embodiment of the invention. For examples graphical user interface (GUI) pages as shown in FIG. 4A may be provided by VM management server 120 or running within a client machine such as client 150 of FIG. 1.

Referring to FIG. 4A, a user or administrator of a VM management console, such as console 125, can specifically pull certain VM and backup operational data from a VM management server such as VM management server 120. In this example, the GUI includes preferences page 401, recover page 402, and monitoring page 403, where recover page 402 is selected. From recover page 402, a user can retrieve VM backup operational data during a period of time by specifying the period of time in field 410. The parameter from field 410 is used to compile VM backup information and displays it as report or table 415 as shown in FIG. 4A.

In this example, the operational data presented by report 415 includes various entries, each corresponding to one of the VMs presented and identified by VM identifier 421. The operational data associated with each VM includes, but is not limited to, VM host 422 hosting the corresponding VM, backup server 423 storing a backup of the VM, backup host or backup management server 424 that manages the backup operations, availability of the backup 425, the date of the VM was backed up 426, and recover destination 427. Some of the fields 422-427 may be editable. For example, the user can click on field 426 to specify a different date of backup or field 427 to specify a different destination node, for example, through a pull-down menu. Once the user activates recover button 430, the VM backup data that was backed on date 426 is recovered from a backup server specified in field 423 to a destination specified in field 427. Preference page 401 allows the user to specify one or more preferred backup servers as shown in FIG. 4B, while monitoring page 403 displaying any events of VMs monitored by the VM management server as shown in FIG. 4C.

Figure 5:
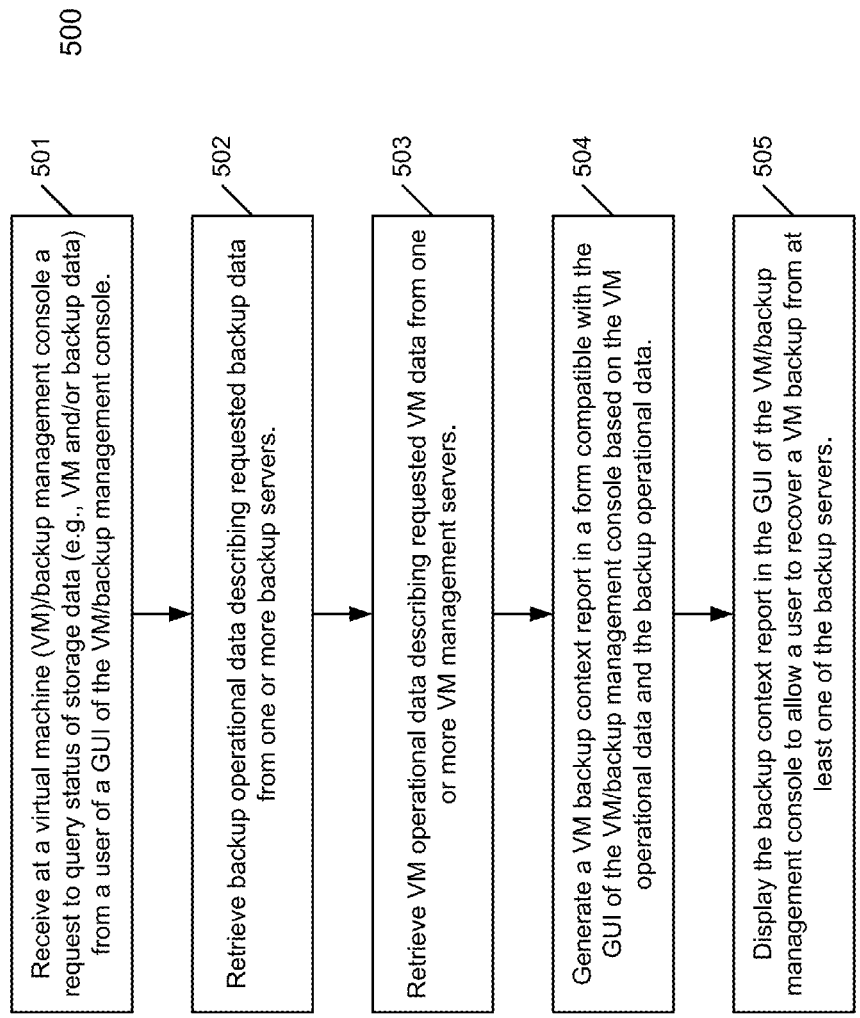
FIG. 5 is a flow diagram illustrating a method for managing virtual machine backup information according to one embodiment of the invention.

FIG. 5 is a flow diagram illustrating a method for managing virtual machine backup information according to one embodiment of the invention. Method 500 may be performed by processing logic that may include software, hardware, or a combination thereof. For example, method 500 may be performed by VM/backup management console 125. Referring to FIG. 5, at block 501, processing logic receives a request to query status of storage data (e.g., VM and/or backup data). At block 502, processing logic retrieves operational data describing the requested VM backup data from one or more backup servers. At block 503, processing logic retrieve VM operational data describing the requested VM data from one or more VM management servers. At block 504, processing logic generates a VM backup context report in a form compatible with the GUI of the VM/backup management console 125 based on the VM operational data and backup operational data. At block 505, the report is displayed in the GUI of VM/backup management console 125 to allow a user to recover a VM backup from at least one of the backup servers.

Figure 6:
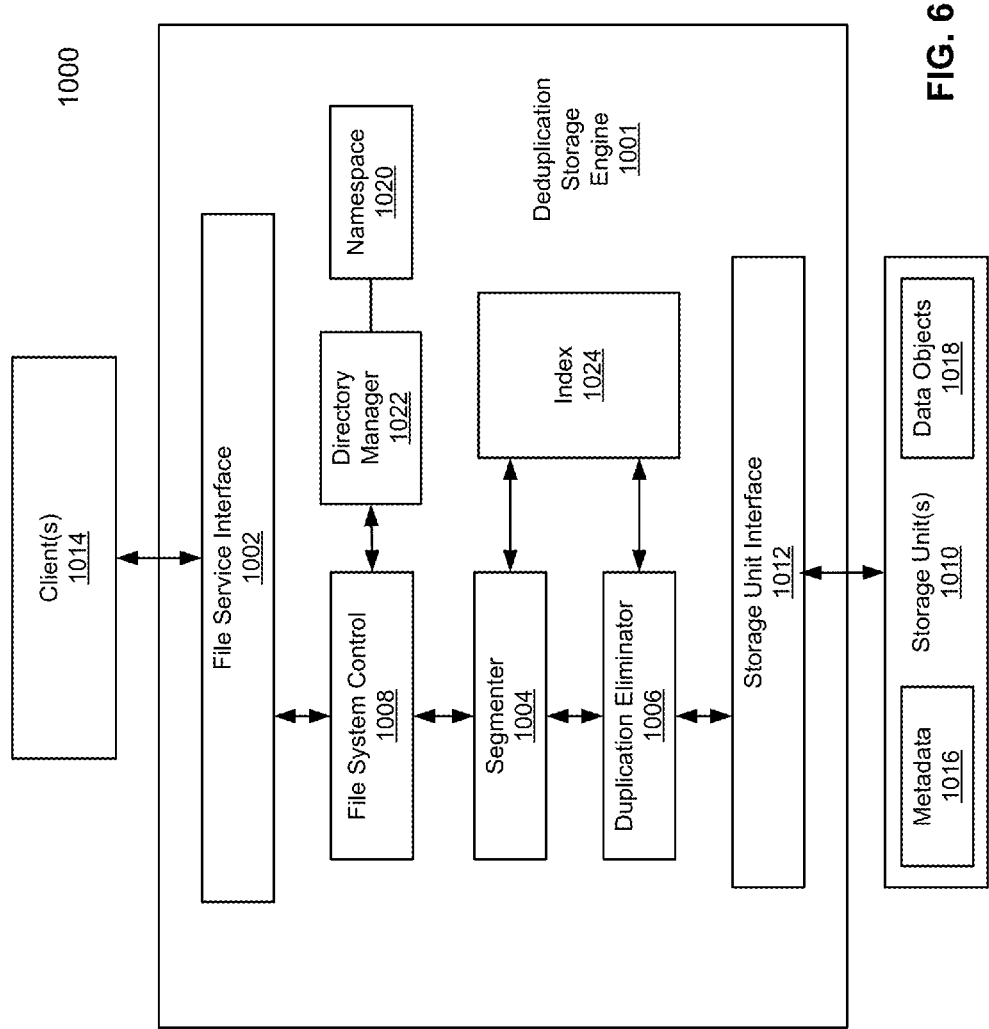
FIG. 6 is a block diagram illustrating a deduplicated storage system according to one embodiment of the invention.

FIG. 6 is a block diagram illustrating a deduplication storage system according to one embodiment of the invention. For example, deduplication storage system 1000 may be implemented as part of a deduplication storage system as described above, such as, for example, the deduplication engine 107 as shown in FIG. 1. In one embodiment, storage system 1000 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 1000 may have a distributed architecture, or all of its components may be integrated into a single unit. Storage system 1000 may be implemented as part of an archive and/or backup system such as a deduplicating storage system available from EMC® Corporation of Hopkinton, Mass.

In one embodiment, storage system 1000 includes a deduplication engine 1001 interfacing one or more clients 1014 with one or more storage units 1010 storing metadata 1016 and data objects 1018. Clients 1014 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 1010 may be implemented locally (e.g., single node operating environment) or remotely (e.g., multi-node operating environment) via an interconnect, which may be a bus and/or a network (e.g., a storage network). In one embodiment, one of storage units 1010 operates as an active storage to receive and store external or fresh user data from a client (e.g., an end-user client or a primary storage system associated with one or more end-user clients), while the another one of storage units 1010 operates as a target storage unit to periodically archive data from the active storage unit according to an archiving policy or scheme. Storage units 1010 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1010 may also be combinations of such devices. In the case of disk storage media, the storage units 1010 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 1016, may be stored in at least some of storage units 1010, such that files can be accessed independent of another storage unit. Metadata of each storage unit includes enough information to provide access to the files it contains. In one embodiment, metadata may include fingerprints contained within data objects 1018, where a data object may represent a data chunk, a compression region (CR) of one or more data chunks, or a container of one or more CRs. Fingerprints are mapped to a particular data object via metadata 1016, enabling the system to identify the location of the data object containing a data chunk represented by a particular fingerprint. A fingerprint may be generated based on at least a portion of a data chunk, for example, by applying a predetermined mathematical algorithm (e.g., hash function) to at least a portion of the content of the data chunk. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 1016 may include a file name, a storage unit identifier (ID) identifying a storage unit in which the chunks associated with the file name are stored, reconstruction information for the file using the chunks, and any other appropriate metadata information. Metadata 1016 may further include a chunk ID, a chunk sketch, a hash of a chunk, an encrypted hash of a chunk, random data, or any other appropriate metadata. In some embodiments, metadata associated with a chunk is used to identify identical and/or similar data segments. The stored metadata enables a faster identification of identical and/or similar data chunks as an ID and/or sketch (e.g., a set of values characterizing the chunk) do not need to be recomputed for the evaluation of a given incoming data segment.

In one embodiment, a chunk ID includes one or more deterministic functions of a data chunk (also referred to as a data segment), one or more hash functions of a data chunk, random data, or any other appropriate data chunk ID. In various embodiments, a data chunk sketch includes one or more deterministic functions of a data chunk, one or more hash functions of a data chunk, one or more functions that return the same or similar value for the same or similar data chunks (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a chunk. For example, a sketch may be generated by applying one or more functions (e.g., hash functions) on a chunk and a subset of the results of the functions performed on the chunk (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 1001 includes file service interface 1002, segmenter 1004 (also referred to as a chunking module or unit), duplicate eliminator 1006, file system control 1008, and storage unit interface 1012. Deduplication storage engine 1001 receives a file or files (or data item(s)) via file service interface 1002, which may be part of a file system namespace 1020 of a file system associated with the deduplication storage engine 1001. The file system namespace 1020 refers to the way files are identified and organized in the system. An example is to organize the files hierarchically into directories or folders, which may be managed by directory manager 1022. File service interface 1012 supports a variety of protocols, including a network file system (NFS), a common Internet file system (CIFS), and a virtual tape library interface (VTL), etc.

The file(s) is/are processed by segmenter 1004 and file system control 1008. Segmenter 1004, also referred to as a content store, breaks the file(s) into variable-length chunks based on a variety of rules or considerations. For example, the file(s) may be broken into chunks by identifying chunk boundaries. Chunk boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more chunks that originally made up a data block, data stream, file, or directory that was/were previously stored.

In some embodiments, chunks are segmented by identifying chunk boundaries that are content-based, such as, for example, a hash function is applied to values of data within a sliding window through the data stream or block and when the hash function is equal to a value (or equal to one of several values) then a chunk boundary is identified. In various embodiments, chunk boundaries are identified using content based functions operating on a sliding window within a data stream or block that have a minimum or maximum or other value or any other appropriate content based chunking algorithm. In various embodiments, chunks include fixed-length chunks, variable length chunks, overlapping chunks, non-overlapping chunks, chunks with a minimum size, chunks with a maximum size, or any other appropriate chunks. In various embodiments, chunks include files, groups of files, directories, a portion of a file, a portion of a data stream with one or more boundaries unrelated to file and/or directory boundaries, or any other appropriate chunk.

In one embodiment, a chunk boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, file system control 1008, also referred to as a file system manager, processes information to indicate the chunk(s) association with a file. In some embodiments, a list of fingerprints is used to indicate chunk(s) associated with a file. File system control 1008 passes chunk association information (e.g., representative data such as a fingerprint) to index 1024. Index 1024 is used to locate stored chunks in storage units 1010 via storage unit interface 1012. Duplicate eliminator 1006, also referred to as a segment store, identifies whether a newly received chunk has already been stored in storage units 1010. In the event that a chunk has already been stored in storage unit(s), a reference to the previously stored chunk is stored, for example, in a chunk or segment tree associated with the file, instead of storing the newly received chunk. A chunk or segment tree of a file may include one or more nodes and each node represents or references one of the deduplicated chunks stored in storage units 1010 that make up the file. Chunks are then packed by a container manager (which may be implemented as part of storage unit interface 1012) into one or more storage containers stored in storage units 1010. The deduplicated chunks may be further compressed into one or more CRs using a variation of compression algorithms, such as a Lempel-Ziv algorithm before being stored. A container may contain one or more CRs and each CR may contain one or more deduplicated chunks (also referred to deduplicated segments). A container may further contain the metadata such as fingerprints, sketches, type of the data chunks, etc. that are associated with the data chunks stored therein.

When a file is to be retrieved, file service interface 1002 is configured to communicate with file system control 1008 to identify appropriate chunks stored in storage units 1010 via storage unit interface 1012. Storage unit interface 1012 may be implemented as part of a container manager. File system control 1008 communicates (e.g., via segmenter 1004) with index 1024 to locate appropriate chunks stored in storage units via storage unit interface 1012. Appropriate chunks are retrieved from the associated containers via the container manager and are used to construct the requested file. The file is provided via interface 1002 in response to the request. In one embodiment, file system control 1008 utilizes a tree (e.g., a chunk tree obtained from namespace 1020) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1001 may be implemented in software (e.g., executable code executed in a memory by a processor), hardware (e.g., processor(s)), or a combination thereof. For example, deduplication engine 1001 may be implemented in a form of executable instructions that can be stored in a machine-readable storage medium, where the instructions can be executed in a memory by a processor.

In one embodiment, storage system 1000 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   receiving, at a virtual machine (VM) management console, a request for querying VM backup data stored in a plurality of backup servers, the VM management console managing a plurality of VMs running within a plurality of data processing systems over a network;
   in response to the request, retrieving, by the VM management console, backup operational data from a plurality of backup servers, the backup operational data describing the VM backup data backed up from the data processing system, including
      identifying a backup host identifier from the request, the backup host identifier identifying a host that initiated backup operations from one or more of the data processing systems to one or more of the backup servers, and
      transmitting the backup host identifier to the backup storage servers to obtain operational data concerning VM backup data of the backup operations initiated by the identified host;
   generating a VM backup report having the backup operational data therein and VM information of VMs that are associated with the VM backup data described by the backup operational data; and
   presenting the VM backup report to allow a user of the client to select one or more of the VMs to be recovered from at least one of the backup servers.

2. The method of claim 1, wherein the backup servers comprise different backup servers provided by different backup storage providers, and wherein the VM management console is to communicate with each of the backup servers via a respective backup and recover (backup/recover) interface specifically configured to access the respective backup server.

3. The method of claim 1, further comprising:
   receiving at the VM management console a second request, the second request having information selecting a first of VMs presented in the VM backup report;
   in response to the second request, determining a first of the backup servers that stores first VM backup data corresponding to the first VM;
   identifying a destination node from the second request to which the first VM backup data is recovered; and
   initiating a recovery process of recovering the first VM backup data corresponding to the first VM from the first backup server to the destination node.

4. The method of claim 1, wherein retrieving backup operational data from the backup servers comprises:
   identifying a first of the data processing systems from the request, wherein the first data processing system is configured to backup VM data to one or more of the backup servers; and
   receiving the backup operational data describing only backup VM data specifically associated with the first data processing system.

5. The method of claim 1, wherein retrieving backup operational data from the backup servers comprises:
   identifying one or more backup identifiers from the request, the backup identifiers uniquely identifying one or more of a plurality of VM backup images maintained by the backup servers; and
   transmitting the backup identifiers to the backup servers to obtain operational data concerning one or more VM backup images that are identified by the backup identifiers.

6. A computer-implemented method, comprising:
   receiving, at a virtual machine (VM) management console, a request for querying VM backup data stored in a plurality of backup servers, the VM management console managing a plurality of VMs running within a plurality of data processing systems over a network;
   in response to the request, retrieving, by the VM management console, backup operational data from a plurality of backup servers, the backup operational data describing the VM backup data backed up from the data processing system, including
      identifying a time period identifier from the request, the time period identifier identifying a period of time during which data is backed up to the backup servers, and
      transmitting the time period identifier to the backup servers to obtain backup operational data concerning VM backup data associated with the identified period of time;

generating a VM backup report having the backup operational data therein and VM information of VMs that are associated with the VM backup data described by the backup operational data; and presenting the VM backup report to allow a user of the client to select one or more of the VMs to be recovered from at least one of the backup servers.

7. The method of claim 1, wherein retrieving backup operational data from the backup servers comprises:

identifying a VM identifier from the request, the VM identifier identifying a VM that running in one of the data processing systems; and retrieving the operational data from at least one of the backup servers concerning VM backup data associated with the identified VM.

8. A non-transitory machine-readable storage medium having instructions stored therein, which when executed by a processor, cause the processor to perform operations, the operations comprising:

receiving, at a virtual machine (VM) management console, a request for querying VM backup data stored in a plurality of backup servers, the VM management console managing a plurality of VMs running within a plurality of data processing systems over a network;

in response to the request, retrieving, by the VM management console, backup operational data from a plurality of backup servers, the backup operational data describing the VM backup data backed up from the data processing system, including identifying a backup host identifier from the request, the backup host identifier identifying a host that initiated backup operations from one or more of the data processing systems to one or more of the backup servers, and transmitting the backup host identifier to the backup storage servers to obtain operational data concerning VM backup data of the backup operations initiated by the identified host;

generating a VM backup report having the backup operational data therein and VM information of VMs that are associated with the VM backup data described by the backup operational data; and presenting the VM backup report to allow a user of the client to select one or more of the VMs to be recovered from at least one of the backup servers.

9. The non-transitory machine-readable storage medium of claim 8, wherein the backup servers comprise different backup servers provided by different backup storage providers, and wherein the VM management console is to communicate with each of the backup servers via a respective backup and recover (backup/recover) interface specifically configured to access the respective backup server.

10. The non-transitory machine-readable storage medium of claim 8, wherein the operations further comprise:

receiving at the VM management console a second request, the second request having information selecting a first of VMs presented in the VM backup report;

in response to the second request, determining a first of the backup servers that stores first VM backup data corresponding to the first VM;

identifying a destination node from the second request to which the first VM backup data is recovered; and initiating a recovery process of recovering the first VM backup data corresponding to the first VM from the first backup server to the destination node.

11. The non-transitory machine-readable storage medium of claim 8, wherein retrieving backup operational data from the backup servers comprises:

identifying a first of the data processing systems from the request, wherein the first data processing system is configured to backup VM data to one or more of the backup servers; and receiving the backup operational data describing only backup VM data specifically associated with the first data processing system.

12. The non-transitory machine-readable storage medium of claim 8, wherein retrieving backup operational data from the backup servers comprises:

identifying one or more backup identifiers from the request, the backup identifiers uniquely identifying one or more of a plurality of VM backup images maintained by the backup servers; and transmitting the backup identifiers to the backup servers to obtain operational data concerning one or more VM backup images that are identified by the backup identifiers.

13. A non-transitory machine-readable storage medium having instructions stored therein, which when executed by a processor, cause the processor to perform operations, the operations comprising:

receiving, at a virtual machine (VM) management console, a request for querying VM backup data stored in a plurality of backup servers, the VM management console managing a plurality of VMs running within a plurality of data processing systems over a network;

in response to the request, retrieving, by the VM management console, backup operational data from a plurality of backup servers, the backup operational data describing the VM backup data backed up from the data processing system, including identifying a time period identifier from the request, the time period identifier identifying a period of time during which data is backed up to the backup servers, and transmitting the time period identifier to the backup servers to obtain backup operational data concerning VM backup data associated with the identified period of time;

generating a VM backup report having the backup operational data therein and VM information of VMs that are associated with the VM backup data described by the backup operational data; and presenting the VM backup report to allow a user of the client to select one or more of the VMs to be recovered from at least one of the backup servers.

14. The non-transitory machine-readable storage medium of claim 8, wherein retrieving backup operational data from the backup servers comprises:

identifying a VM identifier from the request, the VM identifier identifying a VM that running in one of the data processing systems; and retrieving the operational data from at least one of the backup servers concerning VM backup data associated with the identified VM.

15. A data processing system, comprising:
a processor;
a memory coupled to the processor; and
a virtual machine (VM) management console executed in the memory by the processor to perform operations, the operations including receiving a request for querying VM backup data stored in a plurality of backup servers, the VM management console managing a plurality of VMs running within a plurality of data processing systems over a network, in response to the request, retrieving backup operational data from a plurality of backup servers, the backup operational data describing the VM backup data backed up from the data processing system, including identifying a backup host identifier from the request, the backup host identifier identifying a host that initiated backup operations from one or more of the data processing systems to one or more of the backup servers, and transmitting the backup host identifier to the backup storage servers to obtain operational data concerning VM backup data of backup operations initiated by the identified host, generating a VM backup report having the backup operational data therein and VM information of VMs that are associated with the VM backup data described by the backup operational data, and presenting the VM backup report to allow a user of the client to select one or more of the VMs to be recovered from at least one of the backup servers.

16. The system of claim 15, wherein the backup servers comprise different backup servers provided by different backup storage providers, and wherein the VM management console is to communicate with each of the backup servers via a respective backup and recover (backup/recover) interface specifically configured to access the respective backup server.

17. The system of claim 15, wherein the operations further comprise:

receiving a second request, the second request having information selecting a first of VMs presented in the VM backup report;

in response to the second request, determining a first of the backup servers that stores first VM backup data corresponding to the first VM;

identifying a destination node from the second request to which the first VM backup data is recovered; and initiating a recovery process of recovering the first VM backup data corresponding to the first VM from the first backup server to the destination node.

18. The system of claim 15, wherein retrieving backup operational data from the backup servers comprises:

identifying a first of the data processing systems from the request, wherein the first data processing system is configured to backup VM data to one or more of the backup servers; and receiving the backup operational data describing only backup VM data specifically associated with the first data processing system.

19. The system of claim 15, wherein retrieving backup operational data from the backup servers comprises:

identifying one or more backup identifiers from the request, the backup identifiers uniquely identifying one or more of a plurality of VM backup images maintained by the backup servers; and transmitting the backup identifiers to the backup servers to obtain operational data concerning one or more VM backup images that are identified by the backup identifiers.

20. A data processing system, comprising:

a processor;

a memory coupled to the processor; and a virtual machine (VM) management console executed in the memory by the processor to perform operations, the operations including receiving a request for querying VM backup data stored in a plurality of backup servers, the VM management console managing a plurality of VMs running within a plurality of data processing systems over a network, in response to the request, retrieving backup operational data from a plurality of backup servers, the backup operational data describing the VM backup data backed up from the data processing system, including identifying a time period identifier from the request, the time period identifier identifying a period of time during which data is backed up to the backup servers, and transmitting the time period identifier to the backup servers to obtain backup operational data concerning VM backup data associated with the identified period of time, generating a VM backup report having the backup operational data therein and VM information of the VMs that are associated with the VM backup data described by the backup operational data, and presenting the VM backup report to allow a user of the client to select one or more of the VMs to be recovered from at least one of the backup servers.

21. The system of claim 15, wherein retrieving backup operational data from the backup servers comprises:

identifying a VM identifier from the request, the VM identifier identifying a VM that running in one of the data processing systems; and retrieving the operational data from at least one of the backup servers concerning VM backup data associated with the identified VM.

* * * * *